(12) United States Patent
Gogolla et al.

(10) Patent No.: US 8,767,188 B2
(45) Date of Patent: Jul. 1, 2014

(54) MEASURING DEVICE FOR DISTANCE MEASUREMENT

(75) Inventors: Torsten Gogolla, Schaan (LI); Stefan Tiefenthaler, Meiningen (AT); Roman Steffen, Rebstein (CH); Helmut Seifert, Serba (DE); Gero Schusser, Jena (DE)

(73) Assignees: Hilti Aktiengesellschaft, Schaan (LI); ESW GmbH, Wedel (DE)

( * ) Notice: Subject to any disclaimer, the term of this patent is extended or adjusted under 35 U.S.C. 154(b) by 0 days.

(21) Appl. No.: 13/481,419

(22) Filed: May 25, 2012

(65) Prior Publication Data

US 2012/0300190 A1 Nov. 29, 2012

(30) Foreign Application Priority Data

May 26, 2011 (DE) .......................... 10 2011 076 491

(51) Int. Cl.
*G01C 3/08* (2006.01)
(52) U.S. Cl.
USPC ............. 356/4.01; 356/3; 356/3.12; 356/3.03
(58) Field of Classification Search
USPC ........ 356/4.01, 3, 3.12, 3.03, 3.11, 3.14, 3.16
See application file for complete search history.

(56) References Cited

U.S. PATENT DOCUMENTS

| | | | |
|---|---|---|---|
| 4,154,529 A | | 5/1979 | Dyott |
| 6,115,111 A | * | 9/2000 | Korah et al. ................. 356/4.01 |
| 6,359,681 B1 | * | 3/2002 | Housand et al. ............. 356/4.01 |
| 6,556,282 B2 | * | 4/2003 | Jamieson et al. ............ 356/4.01 |
| 6,665,063 B2 | * | 12/2003 | Jamieson et al. ........... 356/141.1 |
| 7,474,387 B2 | * | 1/2009 | Yabe ............................ 356/4.01 |
| 7,609,365 B2 | * | 10/2009 | Yabe ............................ 356/5.01 |
| 7,639,346 B2 | * | 12/2009 | Booker, Jr. ................... 356/5.02 |
| 7,684,058 B2 | | 3/2010 | Sprenger |
| 7,768,629 B2 | * | 8/2010 | Typpo et al. ................ 356/4.01 |
| 7,948,641 B2 | * | 5/2011 | Lukas et al. .................. 356/622 |
| 8,203,703 B1 | * | 6/2012 | Kane et al. ................. 356/141.5 |

(Continued)

FOREIGN PATENT DOCUMENTS

| DE | 71 40 162 U | 10/1972 |
|---|---|---|
| DE | 198 04 050 A1 | 8/1999 |

(Continued)

OTHER PUBLICATIONS

European Search Report, dated Sep. 17, 2012, 7 pages total.

(Continued)

*Primary Examiner* — Isam Alsomiri
*Assistant Examiner* — Assres H Woldemaryam
(74) *Attorney, Agent, or Firm* — Crowell & Moring LLP

(57) ABSTRACT

A measuring device for measuring a distance between a reference mark and a target object is disclosed. The device includes a beam source, which is embodied as an electro-optical component and emits a laser beam along an optical axis, a detector, which is embodied as an additional electro-optical component and receives a reception beam reflected and/or scattered by the target object along an optical axis, a beam forming optics, which forms the laser beam and the reception beam along an optical axis, and a beam splitting optics, which deflects the laser beam or the reception beam. An optics carrier is provided with a first receptacle for mounting a first of the electro-optical components and a second receptacle for mounting the beam forming optics. The optics carrier is monolithic.

13 Claims, 4 Drawing Sheets

(56) References Cited

U.S. PATENT DOCUMENTS

| | | |
|---|---|---|
| D673,062 S * | 12/2012 | Marzynski ............... D10/70 |
| 2001/0050763 A1 | 12/2001 | Shirai |
| 2004/0051860 A1 * | 3/2004 | Honda et al. ............... 356/4.01 |
| 2005/0280802 A1 * | 12/2005 | Liu ............... 356/5.01 |
| 2006/0285103 A1 | 12/2006 | Carlhoff et al. |
| 2010/0302527 A1 * | 12/2010 | Gogolla et al. ............ 356/4.01 |
| 2010/0309453 A1 * | 12/2010 | Gogolla et al. ............ 356/4.01 |

FOREIGN PATENT DOCUMENTS

| | | |
|---|---|---|
| DE | 102 44 638 A1 | 4/2004 |
| EP | 1 351 070 A1 | 10/2003 |
| EP | 1 752 788 A1 | 2/2007 |
| GB | 2 334 172 A | 8/1999 |
| WO | WO2004/036145 A1 | 4/2004 |
| WO | WO 2007/017020 A1 | 2/2007 |

OTHER PUBLICATIONS

German Search Report, dated Dec. 9, 2011, 6 pages.

U.S. Patent Application, "Measuring Device for Measuring Distance", filed May 25, 2012, Inventor Torsten Gogolla, et al.

* cited by examiner

MEASURING DEVICE FOR DISTANCE MEASUREMENT

This application claims the priority of German Patent Document No. DE 10 2011 076 491.7, filed May 26, 2011, the disclosure of which is expressly incorporated by reference herein.

BACKGROUND AND SUMMARY OF THE INVENTION

The present invention relates to a measuring device for measuring the distance between a reference mark and a target object.

Measuring devices for laser distance measuring systems consist of one electro-optical component embodied as a beam source, another electro-optical component embodied as a detector and a beam forming system having transmitter optics and receiver optics. The beam source and the transmitter optics are referred to as a transmission device, and a detector and the receiver optics are referred to a reception device. The beam source emits a laser beam along an optical axis, this beam being directed at the target object by the transmitter optics. A reception beam reflected and/or scattered by the target object is formed by the receiver optics and directed at the detector along an optical axis. Measuring devices are subdivided into paraxial arrangements, in which the optical axes of the transmitting and receiving devices run with a parallel offset, and coaxial arrangements, in which the optical axes of the transmitting and receiving devices are situated one above the other and are separated with the aid of beam splitting optics. In the case of coaxial arrangements, the transmitter optics and the receiver optics are integrated into a shared beam forming optics, forming the laser beam and the reception beam.

European Patent Document No. EP 1 351 070 A1 discloses a known measuring device having a paraxial arrangement of the transmitting and receiving devices. The beam source, the transmitter optics and the receiver optics are mounted on an essentially rigid optics carrier. The detector is mounted on a circuit board, which is connected to the optics carrier by a screw connection in a mechanically rigid manner. The optics carrier comprises three receptacles for mounting the beam source, the transmitter optics, and the receiver optics. The beam source and the receiver optics are inserted into the receptacles in the optics carrier as far as the stop and are optionally secured in the optics carrier with an adhesive bond. The transmitter optics is adjustable along its optical axis in the optics carrier, is adjusted with the beam source activated and is glued to the optics carrier in the adjusted position. With the beam source activated, the detector is shifted by a manipulator in relation to the circuit board in all three directions in space, i.e., in the direction of its optical axis and in the plane perpendicular to the optical axis until the reception beam strikes a predetermined area of the detector. Then the detector is secured on the circuit board in the adjusted position using a soldered joint. Adjustment tolerances are compensated by adjustment gaps with soldered bridges and enlarged contact faces.

In the case of measuring devices having a paraxial arrangement of the transmitting and receiving devices, it is a disadvantage that the transmitter optics and the receiver optics are arranged side by side in space; and the two optics need more space in a plane perpendicular to the optical axes than is the case with a coaxial arrangement. Furthermore, a parallel offset between the optical axes of the transmitting and receiving device, which is known as parallax, results in the fact that at short distances from the target object, imaging of the reception beam on the active area of the detector is shifted with a decrease in the distance from the optical axis of the receiver optics and undergoes a widening of the beam cross section in the detector plane. Because of the parallel offset between the optical axes of the transmitting and receiving devices, it is necessary to use complex multifocal receiver optics or a segmented detector of a relatively great longitudinal extent in measuring devices having a paraxial arrangement of the transmitting and receiving devices. The multifocal receiver optics ensures that, due to a partially greater refractive power of the receiver optics, light from the near range is refracted more than light from the remote range, such that this light reaches the detector at least partially despite the shift in the reception beam. A segmented detector of a great longitudinal extent results in the fact that a shifted reception beam is not even detected.

Measuring devices having a coaxial arrangement of the transmitting and receiving devices have the advantage of being parallax free in comparison with paraxial arrangements. However, the disadvantage is that there is optical crosstalk from the beam source to the detector because the same optical channel is used for the transmission path and the reception path. Optical crosstalk leads to a cyclic distance measurement error, i.e., a measurement error that changes periodically with the distance. To reduce the problems of optical crosstalk and excess light scatter on air particles or aerosols in the near range, German Patent Document No. DE 203 80 221 U1 proposes an integrated optical component which forms the laser beam and the reception beam so that they surround one another but do not overlap to a great extent in the near range. It is a disadvantage that the optical component is embodied as a lens with a large diameter and a large focal distance, which in turn necessitates a detector with a large active area. On the whole, the design according to DE 203 80 221 U1 is not suitable for constructing an inexpensive and compact measuring device for a laser distance measuring system.

It would be desirable to improve a measuring device with regard to the disadvantages mentioned above. The object of the present invention is to provide an inexpensive and compact measuring device for a laser distance measuring system with a high measuring precision, such that the measuring device should be suitable for use in the near range and in the far range.

According to the invention, an optics carrier having a first receptacle for mounting a first of the electro-optical components and having a second receptacle for mounting the beam forming optics is provided, wherein the optics carrier has a monolithic design. Electro-optical components are optical components such as a beam source or a detector, for example, which must be supplied with electricity for operation and which convert electricity into light and/or convert light into electricity.

A monolithic optics carrier is made of one material and is not assembled from multiple individual parts. Monolithic optics carriers have a connecting zone between the first and second joining partners. A monolithic optics carrier has the advantage over a multipart optics carrier that, under the influence of temperature, the optics carrier undergoes uniform changes, and there are no regions in the optics carrier that undergo different changes as a function of temperature because of different properties of the materials. The stability of the measuring device is increased by the monolithic optics carrier. The optical components can be adjusted accurately in relation to one another and the adjusted positions are retained under various ambient conditions. As the optical components are aligned more precisely in relation to one another and as the stability of this alignment is greater, the active area of the detector may be smaller, the dimensions of the receiver optics required for a high measurement performance may also be smaller, and the entire measuring device may be smaller. Due to a small active area of the detector, very little interfering outside light and/or sunlight is detected. However, more interfering outside light and sunlight are detected because of the larger beam angle due to the reduction in the focal distance of the receiver optics. A small active area of the detector compensates at least partially for the effect of a reduced focus of the receiver optics.

The first of the electro-optical components and the beam forming optics are preferably adjustable in the direction of the respective optical axes during the adjustment of the measuring device in its receptacles. The adjustability of the electro-optical components and the beam forming optics in relation to the optics carrier in a direction of adjustment running essentially parallel to the respective assigned optical axis prevents a gap between the circuit board and the second of the electro-optical components, which would have necessitated bridging by a solder bridge. The fact that the formation of a solder bridge is avoided increases the reliability of the mechanical mount of the electro-optical components and improves the high-frequency properties of the measuring device.

In a preferred refinement of the invention, the second form of the electro-optical components is arranged on a circuit board, where the circuit board is connectable to the optics carrier via a connecting device. The second of the electro-optical components is adjustable in a plane essentially perpendicular to the optical axis of the laser beam or the reception beam which is allocated to the second of the electro-optical components and can be secured in the adjusted position. The plane in which the second of the electro-optical components is adjustable runs essentially perpendicular to the assigned optical axis. A minor deviation from the right angle is tolerable as long as the resulting change in distance from the beam forming optics does not exceed an admissible value. For example, a change in the distance from the beam forming optics of approximately 10 μm is the result of an adjustment distance of 500 μm in the plane perpendicular to the reception beam (detector as the second of the electro-optical components) and an angle deviation of 1°. This change in distance results in a displacement of the focal position which is undesirable during adjustment of the measuring device. The angular deviation may be only of the order of magnitude such that the resulting displacement in the focal position during adjustment of the measuring device is still acceptable. The optical and electro-optical components arranged in the optics carrier are adjustable in the direction of the respective assigned optical axes, i.e., the directions of adjustment of the components run essentially parallel to the optical axes. Deviations from parallel which occur, for example, due to manufacturing tolerance in the optics carrier, are admissible.

The second receptacle for mounting the beam forming optics preferably has a first supporting surface, a second supporting surface and a clamping surface, such that the supporting and clamping surfaces are integrated into the optics carrier. A supporting surface is defined as a supporting area which acts through the gravity of the beam forming optics and the clamping surface is defined as a supporting area which acts not through the gravity of the beam forming optics but instead through an additional force. The supporting and clamping surfaces ensure that the beam forming optics are precisely adjustable in making the adjustment and can be secured in the position after being adjusted. Optionally the beam forming optics may additionally be used through an adhesive bond to the optics carrier. The additional adhesive bond ensures that even with very great mechanical stress such as free fall of the measuring device, the adjusted position is preserved.

The optics carrier especially preferably has a spring element which forms the clamping surface for the beam forming optics. The integration of the spring element with the clamping surface in the optics carrier ensures that the second receptacle for the beam forming optics will undergo uniform changes under the influence of temperature and that a uniform introduction of force into the beam forming optics is ensured.

The second receptacle preferably has at least one guide surface which is integrated into the optics carrier. The alignment of the beam forming optics is improved by the additional guide surfaces, and the risk that the beam forming optics will be introduced into the second receptacle of the optics carrier in a tilted position is reduced. The guide surfaces ensure that the beam forming optics will be aligned accurately in the beam path of the laser beam. As the alignment of the optical components relative to one another is more accurate and more stable, the active area of the detectors, the focus of the receiver optics and thus the measuring device may be designed to be smaller.

In a preferred embodiment, the optics carrier has a third receptacle for mounting the beam splitting optics with three supporting areas, such that the supporting areas are integrated into the optics carrier. The beam splitting optics deflecting the laser beam or the reception beam at least partially must be provided in a coaxial arrangement to spatially separate the laser beam and the reception beam from one another. The beam splitting optics is embodied as a polarization beam splitter, for example.

The first and second supporting areas are especially preferably embodied as wedge-shaped grooves, and the third supporting area is embodied as a planar supporting surface, the beam splitting optics being clamped on the supporting surface with the aid of a clamping element. The clamping element is designed as a spring element, for example, and is arranged so that the spring force acts over the planar supporting surface as much as possible. The contact of the beam splitting optics in the two wedge-shaped grooves ensures that the respective contact forces and the supporting counterforces act on the beam splitting optics largely in opposite directions, preventing any curvature of the beam splitting optics. As the alignment of the beam splitting optics is more accurate and stable with respect to the other optical components, the active area of the detector, the focus of the receiver optics and thus the measuring device may be designed to be smaller.

In a preferred alternative embodiment, the beam splitting optics is embodied as a pinhole mirror consisting of an opening and a reflective coating, such that the opening is integrated into the optics carrier and the reflective coating surrounds the opening. The reflective coating may be applied directly to a surface of the optics carrier by a surface coating method. With this embodiment of the beam splitting optics, it is possible to omit a clamping element which is necessary for securing the polarization beam splitter. Since the surface to which the reflective coating is applied is integrated into the optics carrier, this ensures that the beam splitting optics and the optics carrier will change uniformly under the influence of temperature, and tilting of the beam splitting optics will be prevented. The stability of the measuring device is increased and the mounting and adjustment effort required for the beam splitting optics are reduced at the same time. A reduction in the mounting and adjustment effort leads to a reduction in the manufacturing cost of the measuring device.

An aperture integrated into the optics carrier is preferably arranged between the beam source and the beam splitting optics in the beam path of the laser beam. The beam splitting optics is embodied, for example, as a polarization beam splitter, as a pinhole mirror or as some other suitable beam splitting optics. The aperture serves to limit the beam angle and/or the numeric aperture of the beam source and to adjust the geometry of the laser beam to the beam splitting optics and the beam forming optics. As an alternative or in addition to the aperture, a light trap is preferably arranged between the beam source and the beam splitting optics, integrated into the optics carrier. The light trap serves to absorb any light of the beam source striking it and also prevents unwanted reflection. Optical and electrical crosstalk from the beam source to the detector is reduced by the aperture and/or the light trap. The adjustment effort is reduced because the aperture and/or the light trap is/are integrated into the optics carrier. The adjustment of the aperture and the light trap relative to the beam source is already performed at the time of manufacturing the receptacles for the optical components in the optics carrier.

In a preferred embodiment, the optics carrier is made of a metallic material. Metallic optics carriers result in electrical shielding between the electro-optical components and reduce the electrical crosstalk between a beam source and a detector.

In a preferred embodiment, the optics carrier is embodied as a die-cast part. The embodiment as a die-cast part has the advantage that complex geometries can be created with a high precision. Die-cast parts have smooth clean surfaces and edges. Furthermore, die casting methods, especially using zinc, allow the production of smaller wall thicknesses in comparison with manufacturing methods such as injection molding or die casting with other metals, e.g., aluminum. Since the optics carrier is manufactured as a die-cast part, complex functions such as spring elements or boreholes can be integrated into the optics carrier without any complex post-processing. This reduces the cost of manufacturing the optics carrier and makes it possible to design an inexpensive measuring device.

The optics carrier is especially preferably designed as a die-cast part made of zinc or zinc alloys which are summarized under the term "zinc". Zinc can be processed with a high precision in die-casting methods and also have a high thermal stability so that fluctuations in temperature, to which laser distance measuring system are often exposed, have only a minor influence on the adjustment status and thus on the measurement properties of the laser distance measuring systems. Various surface coatings are possible with zinc, so that reflective or absorbent coatings can be applied directly to the optics carrier. Zinc also has good electrical shielding properties.

Exemplary embodiments of the invention are described below on the basis of the drawings. These drawings do not necessarily show the exemplary embodiments drawn to scale but instead the drawings are embodied in schematic and/or slightly distorted form, where this serves the purpose of illustration. With regard to the addition of teachings that are discernible directly from the drawings, reference is made to the relevant state of the art. It should be pointed out here that various modifications and changes can be made with regard to the form and the detail of an embodiment without going beyond the general scope of the invention. The features of the invention disclosed in the description, the drawings and the claims, either individually or in any combination, may be essential for this refinement of the invention. Furthermore, all combinations of at least two of the features disclosed in the description, the drawings and/or the claims fall within the scope of the invention. The general idea of the invention is not limited to the precise form or the detail of the preferred embodiment described and illustrated below nor is it limited to a subject which would be restricted in comparison with the subject claimed in the claims. With given dimension ranges, values within the specified limits should also be disclosed as limit values and can be used and claimed as desired. For the sake of simplicity, the same reference numerals are used below for identical or similar parts or parts having an identical or similar function.

DETAILED DESCRIPTION OF THE DRAWINGS

Figure 1:
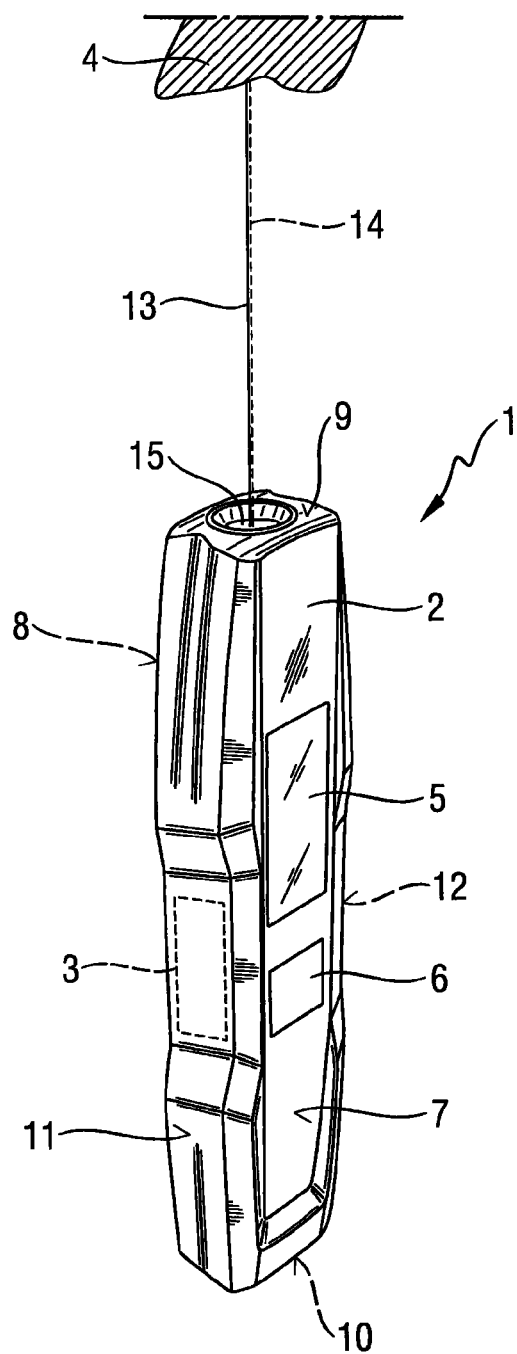
FIG. 1 shows a laser distance measuring system according to the invention with a measuring device.

FIG. 1 shows a laser distance measuring system 1 in a three-dimensional representation. The laser distance measuring system 1 comprises a housing 2, a measuring device 3 with which the distance from a target object 4 can be measured, a display device 5 for displaying the measured distance and an operating device 6 for starting a distance measurement and for setting the laser distance measuring system 1.

The measuring device 3 is arranged in the interior on the housing 2 and the display and operating devices 5, 6 are embedded in the top side 7 of the housing 2. The top side 7 and the bottom side 8 of the housing 2 opposite the top side 7 form the largest housing surfaces of the laser distance measuring system 1. The front and rear sides 9, 10 adjacent to the top side 7 as well as the side faces 11, 12 of the housing 2 are designed to be as small as possible to construct a compact laser distance measuring system 1.

The measuring device 3 emits a laser beam 13, which is directed at the target object 4. A reception beam 14, which is reflected and/or scattered by the target object 4, is detected by the measuring device 3. The distance from the target object 4 is calculated from the time difference between the reception beam 14 and a reference beam separated from the laser beam 13.

The outlet of the laser beam 13 from the housing 2 takes place through an output opening 15 which is embedded in the front side 9 of the housing 2. The optical axis of the laser beam 13 is aligned to be approximately perpendicular to the front side 9. The reception beam 14 coming from the target object 4 enters the laser distance measuring system 1 through the output opening 15. The distance measurement to the target object 4 takes place with respect to a reference mark on the laser distance measuring system. The front side 9 or the rear side 10 is used as reference marks with the laser distance measuring system 1. Switching between the reference marks is accomplished via a switching device.

Figure 2:
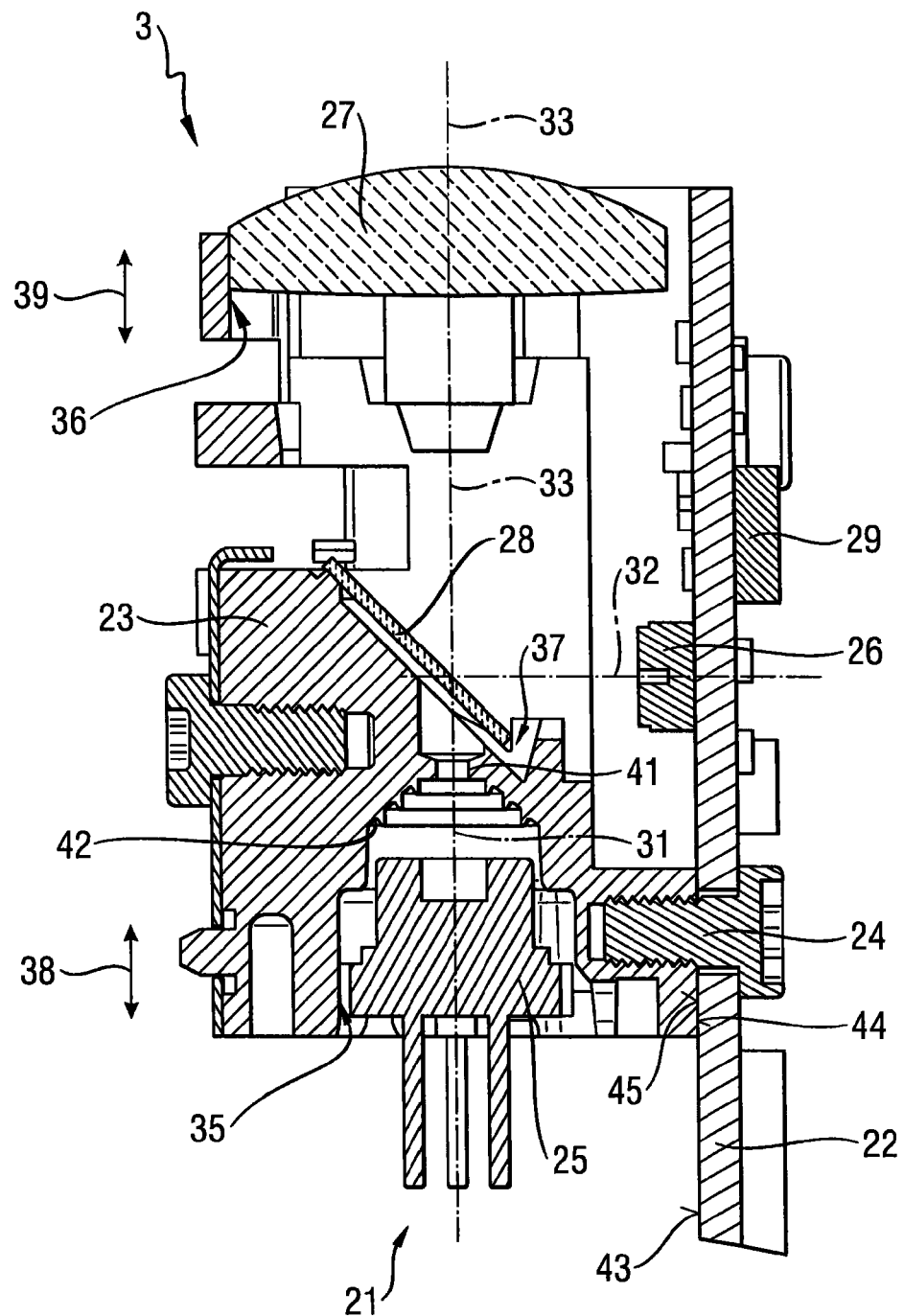
FIG. 2 shows a measuring device consisting of a beam source, which is inserted into a monolithic optics carrier and emits a laser beam, a detector, which is arranged on the front side of a circuit board facing the lens carrier and receives a reception beam, and a beam splitting optics for separating the laser beam and the reception beam.

FIG. 2 shows the measuring device 3 consisting of an optical group 21 and a circuit board 22. The optical group 21 has an optics carrier 23, which is connected to the circuit board 22 via a connecting device 24.

The optics carrier 23 is designed as a monolithic optics carrier made of one material and is not composed of multiple individual parts. Monolithic optics carriers do not have any connecting zone between a first and a second connecting partner. A monolithic optics carrier has the advantage in comparison with a multipart optics carrier that the optics carrier undergoes uniform changes under the influence of temperature so there are no regions in the optics carrier which undergo different changes as a function of temperature due to different material properties. The optics carrier 23 is manufactured of a metallic material such as zinc. Metallic optics carriers create electrical shielding between the electro-optical components and reduce electric crosstalk between the beam source and a detector. Zinc can be processed with a high precision in die casting methods and also has a high thermal stability so that fluctuation in temperature to which laser distance measuring systems are often exposed have only a minor influence on the adjustment status and thus on the measurement properties.

The circuit board 22 is a carrier for electronic and electro-optical components and serves to provide mechanical mounting and electrical connection. Circuit boards are made of electrically insulating material, for example, fiber-reinforced plastic, Teflon® or ceramics, with bonded printed conductors. The components are soldered to a solder surface or in solder eyes and in this way are simultaneously secured mechanically and attached electrically. Larger components may be mounted on the circuit board 22 using adhesive bonds or screw connection.

The measuring device 3 comprises, in addition to the circuit board 22 and the monolithic optics carrier 23, an electro-optical component 25, which is embodied as a beam source, another electro-optical component 26, which is embodied as a detector, a beam forming optics 27, a beam splitting optics 28 and a control and analysis device 29. The beam source 25 is designed as a laser diode, which generates a laser beam in the visible spectrum, for example, a red laser beam with a wavelength of 635 nm or a green laser beam with a wavelength of 532 nm. The detector 26 is embodied as a photodiode, such that the properties of the photodiode 26 are adapted to the laser diode 25. The control and analysis device 29 is connected to the beam source 25 and the detector 26 and, with the aid of the analysis module, determines the distance to the target object 4 from the time difference between a reference beam and the reception beam 14 detected by the detector 26. The beam forming optics 27 is embodied as a lens which forms both the emitted laser beam 13 and the reflected and/or scattered reception beam 14.

With the aid of the beam splitting optics 28, the laser beam 13 coming from the beam source 25 is separated spatially from the reflected and/or scattered reception beam 14. The beam splitting optics 28 is arranged in the beam path of the laser beam 13 between the beam source 25 and the beam forming optics 27 and in the beam path of the reception beam 14 between the beam forming optics 27 and the detector 26. The beam splitting optics 28 ensures that the optical axis 31 of the emitted laser beam 13 and the optical axis 32 of the reception beam 14 striking the detector 26 are different from one another. An optical axis 33 assigned to the beam forming optics 27 forms a common optical axis for the laser beam 13 and the reception beam 14.

In the embodiment in FIG. 2, the beam splitting optics 28 is embodied as a polarization beam splitter, which is embodied to be partially reflective for unpolarized radiation and predominantly transmitting for radiation with the polarization direction of the emitted laser beam 13. Radiation reflected on the target object 4 (reflected component of the reception beam) has a high intensity and has the same polarization direction as the emitted laser beam 13 and radiation scattered on the target object 4 (scattered component of the reception beam) is unpolarized. The degree of transmission for polarized radiation is greater than approximately 80%, for example, and the degree of reflection for polarized radiation is less than approximately 20%. The degree of reflection for unpolarized radiation is approximately 50%. The greater the transmitted portion of the laser beam on the beam splitting optics 28, the better is the visibility of the laser beam on the target object 4. Due to the fact that the degree of reflection for polarized radiation is less than approximately 20%, the reflected radiation is greatly dampened and oversteering of the detector 26 is prevented.

The optics carrier 23 has a first receptacle 35 for the beam source 25, a second receptacle 36 for the beam forming optics 27 and a third receptacle 37 for the beam splitting optics 28. At least during the adjustment of the measuring device 3, the beam source 25 and the beam forming optics 27 are adjustable in their receptacles 35, 36 in forward and/or reverse directions 38, 39 parallel to the respective optical axes 31, 33; the forward and/or reverse directions 38, 39 are also referred to as adjustment directions.

In the embodiment of FIG. 2, the optical axis 31 of the beam source 25 and the optical axis 33 of the beam forming optics 27 are arranged in parallel. Alternatively, the optical axes of the beam source 25 and the beam forming optics 27 are arranged at an angle perpendicular to one another, for example. In this case, the directions of adjustment in which the beam source 25 and the beam forming optics 27 are designed to be adjustable are different from one another. The optical properties of the beam splitting optics 28 determine which portion of the impinging laser beam and/or reception beam is reflected and/or transmitted.

An aperture 41, which is integrated into the monolithic optics carrier 23, is arranged in the beam path of the laser beam 13 between the beam source 25 and the beam splitting optics 28. The aperture 41 serves to limit the beam angle and/or the numerical aperture of the beam source 25 and to adjust the geometry of the laser beam 13 to the beam splitting optics 28 and the beam forming optics 27. A light trap 42 is arranged between the beam source 25 and the aperture 41 and, like the aperture 41, is integrated into the monolithic optics carrier 23. The light trap 42 serves to absorb light striking it and to prevent unwanted reflection. To do so, the light trap 42 is provided on the inside with a low-reflection absorbent coating. Optical and electrical crosstalk from the beam source 25 to the detector 26 is reduced by the aperture 41 and the light trap 42.

The detector 26 is arranged on the front side 43 of the circuit board 22 facing the optics carrier 23 and is physically bonded to the circuit board 22 via a soldered connection. The detector 26 can be assembled automatically in the production of the circuit board 22, for example, and then soldered to the circuit board 22. The detector 26 is attached exclusively to the circuit board 22 and is mechanically restrained; there are no connecting means present to connect the detector 26 directly to the optics carrier 23. The optics carrier 23 is designed to be open at least in the area of the detector 26 on the side facing the detector 26 in the installed state, and is connected with a first contact face 44 via the connecting device 24 to a second contact face 45 of the circuit board 22. The connecting device 24 between the circuit board 22 and the optics carrier 23 is designed to be releasable at least during the adjustment of the detector 26.

The measuring device 3 is adjusted with the aid of an optical instrument comprising a lens and a digital camera chip arranged in the plane of focus of the lens. The optical instrument is set for a desired object distance, such that the object distance may be set as a finite distance, for example, 10 meters, or as an infinite distance. The measuring device 3 is arranged in front of the lens, so that the lens detects the laser beam formed by the beam forming optics 27 and detects an image of the active area of the detector 26 and images it on the camera chip. The laser beam and the image of the active area of the detector 26 are both represented at the same time on the camera chip.

The measuring device 3 is adjusted in two phases: in a first phase, the electro-optical and/or optical components 25, 27, 28 in the optics carrier 23 are adjusted in their respective adjustment directions 38, 39, and in a second phase after adjustment of the optics carrier 23, the detector 26 is adjusted in a plane perpendicular to the respective optical axis 32. The first and second receptacles 35, 36 in the optics carrier 23 are designed so that the electro-optical component 25 and the beam forming optics 27 are essentially adjustable only in their respective adjustment directions 38, 39, but an adjustment in a plane perpendicular to the optical axes 31, 33 is impossible.

In the first phase, the beam splitting optics 28 is first inserted into the third receptacle 37 and secured and/or clamped by a spring element. Next the beam source 25 and the beam forming optics 27 are inserted into their receptacles 35, 36. To adjust the beam forming optics 27 and the beam source 25, the second contact face 45 of the circuit board 22 is brought into contact with the first contact face 44 of the optics carrier 23 to the stop and is detachably connected to the optics carrier 23 by the connecting device 24.

The beam forming optics 27 is shifted in its adjustment direction 39 until the optical instrument which is set for the desired object width detects a sharp image of the active area of the detector 26 through the beam forming optics 27, such that the image is sharp and has a high contrast. In the case of maximal image sharpness, the beam forming optics 27 is adjusted with respect to the active area of the detector 26 for the desired distance, corresponding to the object width of the optical instrument. The second receptacle 36 for the beam forming optics 27 is designed as a press fit, for example, and the beam forming optics 27 is secured by the clamping force of the press fit 36; the beam forming optics 27 is shifted in the adjustment direction 39 against the clamping force of the press fit 36 with a sufficiently high pressure. Alternatively or in addition to the press fit, the beam forming optics 27 may be physically bonded to the optics carrier 23, for example, by an adhesive bond.

The beam source 25 is adjusted downstream from the beam forming optics 27. The beam source 25 emits a laser beam, which is monitored with the aid of the optical instrument. The beam source 25 is shifted in its adjustment direction 38 until the optical instrument detects a minimal focal point of the laser beam through the beam forming optics 27. In this case, the middle portion of the laser beam is at the desired distance. The first receptacle 35 for the beam source 25 is designed as a press fit, for example, and the beam source 25 is secured by the clamping force of the press fit 35; the beam source 25 is shifted in the adjustment direction 38 under a sufficiently high pressure against the clamping force of the press fit 35. Alternatively or in addition to the press fit, the beam source 25 may be physically bonded to the optics carrier 23, for example, by an adhesive bond.

The detector 26 is adjusted after adjusting the electro-optical and optical components 25, 27, 28 in the optics carrier 23. Since the detector 26 is physically bonded via a soldered connection to the circuit board 22, the detector 26 is adjusted in relation to the optics carrier 23 via the circuit board 22. To this end, the connecting device 24, which is designed to be releasable at least during the adjustment of the measuring device 3, is released between the optics carrier 23 and the circuit board 22. The beam source 25 is activated and emits a laser beam, which is detected by the optical instrument together with the image of the active area of the detector 26. The laser beam forms a focal point on the camera chip and the active area of the detector 26 forms a sharp image which is superimposed on the focal point of the laser beam. The circuit board 22 is shifted in the plane which is perpendicular to the optical axis 32 of the reception beam until the focal point of the laser beam is in a certain area of the active area of the detector 26 on the camera chip. The position of the focal point of the laser beam corresponds to the position of a reception beam focused on the detector 26, scattered by a target object arranged in the object width of the optical instrument. During the adjustment of the detector 26 in the plane perpendicular to the optical axis 32, the circuit board 22 is in contact with the first contact face 44 of the optics carrier 23 via the second contact face 45. The first contact face 44 acts as a stop face for the circuit board 22 in the direction of the optical axis 32. The stop face 44 ensures that the position of the detector 26 in the direction of the optical axis 32 is constant, i.e., does not change during the adjustment of the detector 26.

In conclusion, the circuit board 22 in the adjusted position is connected to the optics carrier 23. This connection is accomplished in two steps. In a first step, the circuit board 22 is connected to the optics carrier 23 via an adhesive bond without any force. In a second step, the circuit board 22 is additionally connected to the optics carrier 23 via a screw connection. The advantages of both adhesive bonds and screw connections can be utilized in this way. With an adhesive bond, the force is transferred from one joining partner to the other over the area; an adhesive bond does not require any change in the bonding partners and in many cases can be reversed without any damage to the bonding partners. However, the adhesive bond may undergo changes under the influence of temperature; it may become embrittled at low temperatures or the adhesive bond may soften at high temperatures. In the case of a screw connection, stress peaks occur on the bonding partners, whereas the space between them hardly makes any contribution at all toward the transfer of force. Screw connections, however, are subject to a lower temperature influence and also create an electrical connection between the optics carrier and the circuit board.

Figure 3A:
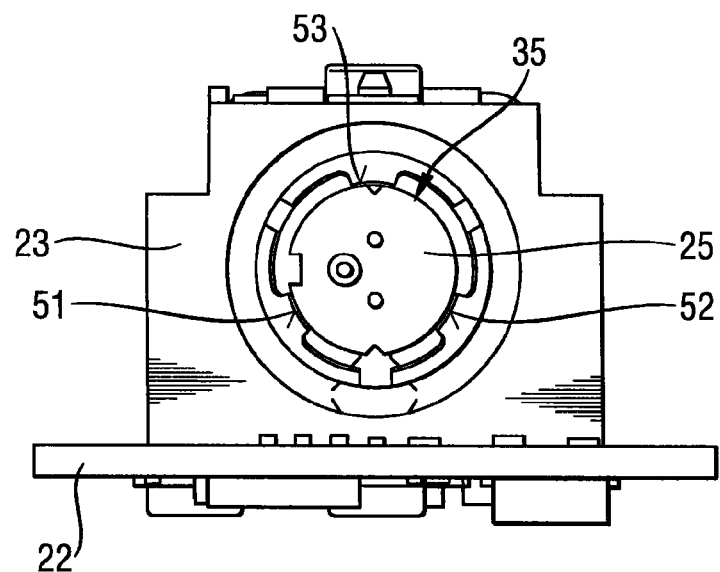
FIGS. 3A and 3B show the monolithic optics carrier of FIG. 2 with an integrated receptacle for the beam source (FIG. 3A) and an integrated receptacle for a beam forming optics for forming the laser beam and the reception beam (FIG. 3B)

FIG. 3A shows the monolithic optics carrier 23 in a view of the beam source 25, which is inserted into the first receptacle 35 of the optics carrier 23. The beam source 25 may be shifted in the adjustment direction 38 for adjustment in the first receptacle 35.

The first receptacle 35 for mounting the beam source 25 on the optics carrier 23 is designed as a three-point support having three supporting areas 51, 52, 53. The three supporting areas 51, 52, 53 are integrated into the optics carrier 23 and designed as clamping elements. To achieve the most uniform possible introduction of force into the beam source 25, the supporting areas 51, 52, 53 are arranged symmetrically around the beam source 25.

Figure 3B:
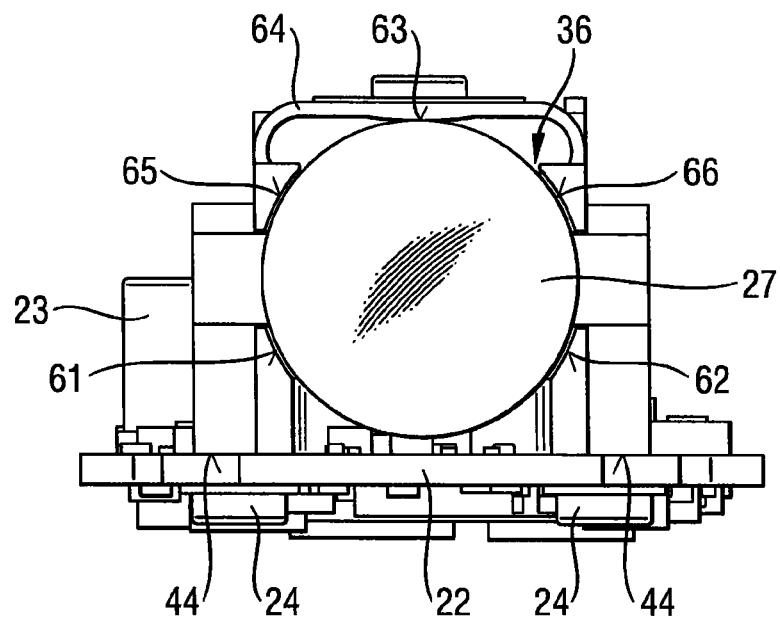

FIG. 3B shows the monolithic optics carrier 23 in a view of the beam forming optics 27, which is inserted into the second receptacle 36 of the monolithic optics carrier 23. The beam forming optics 27 may be shifted in the adjustment direction 39 for adjustment in the second receptacle 36.

The second receptacle 36 for mounting the beam forming optics 27 on the optics carrier 23 is designed like the first receptacle 35 for the beam source 25 as a three-point support having three supporting areas integrated into the monolithic optics carrier 23. As first and second supporting areas, the receptacle 36 has one supporting surface 61, 62 each. A third supporting point is designed as a clamping surface 63 in a spring element 64. The spring element 64 presses the beam forming optics 27 into the receiving surfaces 61, 62 and is also integrated into the monolithic optics carrier 23. To achieve the most uniform possible introduction of force and to prevent curvature of the beam forming optics 27, the supporting areas 61, 62, 63 are arranged symmetrically around the beam forming optics 27.

In addition to the two supporting surfaces 61, 62, the optics carrier 23 has additional guide surfaces 65, 66 which are integrated into the monolithic optics carrier 23. The guide surfaces 65, 66 serve to guide the beam forming optics 27 on insertion into the second receptacle 36 and on adjustment of the beam forming optics 27 along the adjustment direction 39.

Figure 4:
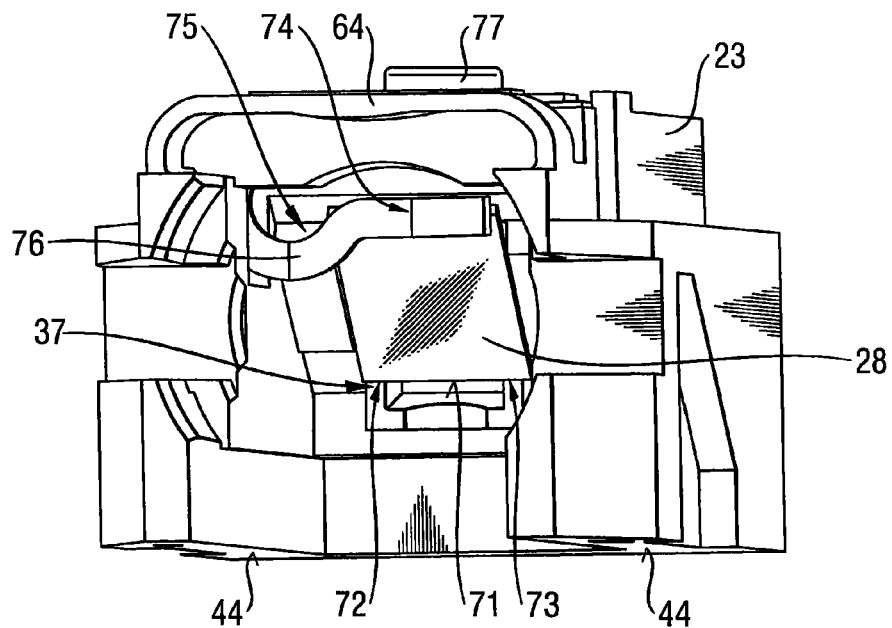
FIG. 4 shows the monolithic optics carrier of FIG. 2 with an integrated receptacle for the beam splitting optics embodied as a polarization beam splitter for separating the laser beam and the reception beam.

FIG. 4 shows the monolithic optics carrier 23 of FIG. 2 in a three-dimensional view of the beam splitting optics 28 which is arranged in the third receptacle 37.

The beam splitting optics 28 has a bottom side which is designed to be flat and is supported on a supporting surface 71 that is integrated into the monolithic optics carrier 23. The supporting surface 71 for the beam splitting optics 28 is designed as a three-point support having three supporting areas integrated into the monolithic optics carrier 23. The supporting surface 71 has a wedge-shaped groove as each of the first and second supporting areas 72, 73. Both supporting areas 72, 73 are situated on the edge of the flat bottom side of the beam splitting optics 28. A third supporting area 74 is arranged opposite the two wedge-shaped grooves 72, 73 in the supporting plane and is also situated at the edge of the planar bottom side of the beam splitting optics 28. The arrangement of the three supporting areas 72, 73, 74 on the planar bottom side of the beam splitting optics 28 ensures that movements or thermal expansion will not cause tilting or curvature of the beam splitting optics 28.

The beam splitting optics 28 is secured with the aid of a mounting device 75 in relation to the supporting surface 71 of the optics carrier 23. The mounting device 75 comprises a spring element 76, which is mounted on the optics carrier 23 by connector 77; for example, the spring element 76 is mounted on the optics carrier 23 by a screw connection. The beam splitting optics 28 is secured on the third supporting area 74 with the spring element 76 on the one hand, and on the other hand, it is secured in the two wedge-shaped grooves 72, 73, which are designed as supporting areas. The spring force preferably acts via the third supporting area 74. The support in the two areas 72, 73 ensures that the respective pressing forces and counterforces act largely in the same direction on the beam splitting optics 28, thereby preventing curvature of the beam splitting optics 28.

Figure 5:
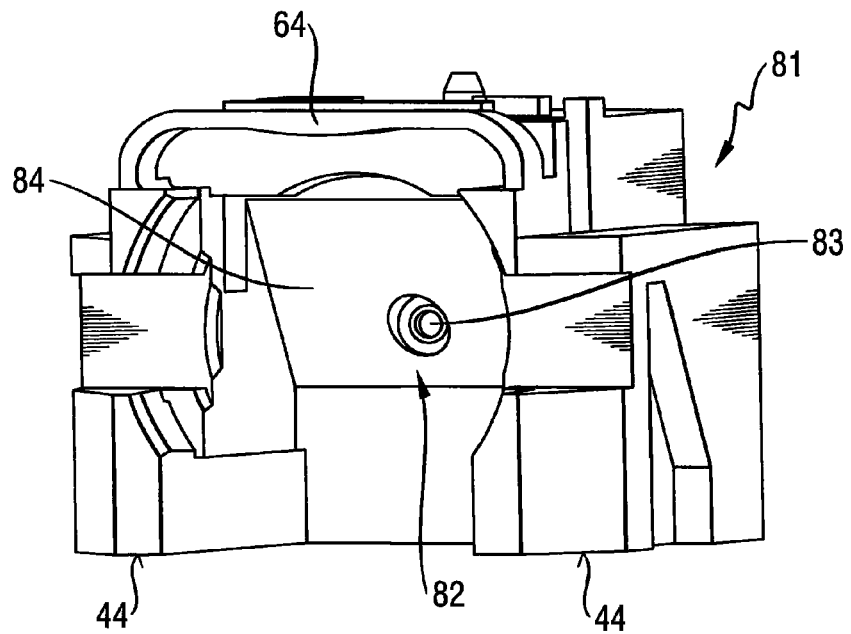
FIG. 5 shows an alternative embodiment of a monolithic optics carrier with a beam splitting optics embodied as a pinhole mirror which is integrated into the optics carrier.

FIG. 5 shows an alternative embodiment of a monolithic optics carrier 81 with beam splitting optics 82 designed as a pinhole mirror integrated into the optics carrier 81. The pinhole mirror 82 is arranged in the beam path of the laser beam 13 between the beam source 25 and the beam forming optics 27 and in the beam path of the reception beam 14 between the beam forming optics 27 and the detector 26.

The pinhole mirror 82 comprises an opening 83 through which the laser beam 13 passes. The diameter of the opening 83 is adjusted to the size of the laser beam 13. A portion of the laser beam strikes the marginal area around the opening 83 and is deflected as the reference beam in the direction of the detector 26. The opening 83 is surrounded by a coating 84, which is designed to be at least partially reflective for the reception beam 14. The degree of reflection of the coating 84 amounts to more than 90%, for example. Reflective components in the reception beam 14, which are reflected on the mirrorized surfaces of the target object 4, have a very high intensity in comparison with the scattered portions. The reflected portions have a beam form very similar to that of the laser beam 13 and are imaged on the beam source 25 by the beam forming optics 27 essentially through the opening 83 and thus largely not reflected onto the detector 26. This greatly dampens the reflected components in the reception beam 14 and thus prevents oversteering of the detector 26.

The opening 83 in the pinhole mirror 82 may also act as an aperture for the laser beam 13 and limit the beam angle and/or the numerical aperture of the beam source 25 and adjust the geometry of the laser beam 13 to the beam splitting optics 82 and the beam forming, optics 27. A light trap may be integrated into the optics carrier 81 between the beam source 25 and the opening 83. Optical and electrical crosstalk from the beam source 25 to the detector 26 is reduced through the opening 83 and the light trap.

The opening 83 may as an alternative may be embodied as an optically transparent medium with a refractive index which is different from that of air. Glass or plastic, for example, is suitable as the optically transparent medium. A small portion of the laser beam 13—4%, for example—is reflected on the transparent medium 83 and reaches the detector 26 directly as the reference beam. The larger portion of the laser beam—96%, for example—passes through the opening 83.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A measuring device for measuring a distance between a reference mark and a target object, comprising:
   a beam source, wherein a laser beam is generatable by the beam source;
   a detector, wherein a reflected beam of the laser beam is detectable by the detector;
   a beam forming optics, wherein the beam forming optics is disposed in a beam path of the laser beam and the reflected beam;
   a beam splitting optics, wherein the laser beam or the reflected beam are deflectable by the beam splitting optics; and
   an optics carrier including a first receptacle, wherein the beam source is mounted in the first receptacle, and a second receptacle, wherein the beam forming optics are mounted in the second receptacle, and wherein the optics carrier is monolithic;
   wherein the beam source and the beam forming optics are only adjustable in a direction of a respective optical axis of the beam source and the beam forming optics; and
   wherein the respective optical axes are parallel.

2. The measuring device according to claim 1, wherein the beam splitting optics includes an opening and a reflective coating, wherein the opening is integrated into the optics carrier, and wherein the reflective coating surrounds the opening.

3. The measuring device according to claim 1, wherein an aperture is disposed in a beam path of a laser beam generated by the beam source between the beam source and the beam splitting optics and wherein the aperture is integrated into the optics carrier.

4. The measuring device according to claim 1, wherein a light trap is disposed in a beam path of a laser beam generated by the beam source between the beam source and the beam splitting optics and wherein the light trap is integrated into the optics carrier.

5. The measuring device according to claim 1, wherein the optics carrier is a metallic material.

6. The measuring device according to claim 1, wherein the optics carrier is a die-cast part.

7. The measuring device according to claim 1, wherein the optics carrier is a die-cast part of zinc or a zinc alloy.

8. A measuring device for measuring a distance between a reference mark and a target object, comprising:
   a beam source, wherein a laser beam is generatable by the beam source;
   a detector, wherein a reflected beam of the laser beam is detectable by the detector;
   a beam forming optics, wherein the beam forming optics is disposed in a beam path of the laser beam and the reflected beam;
   a beam splitting optics, wherein the laser beam or the reflected beam are deflectable by the beam splitting optics; and
   an optics carrier including a first receptacle, wherein the beam source is mounted in the first receptacle, and a second receptacle, wherein the beam forming optics are mounted in the second receptacle, and wherein the optics carrier is monolithic;
   wherein the second receptacle has a first supporting surface, a second supporting surface, and a clamping surface for mounting the beam forming optics such that the first and the second supporting surfaces and the clamping surface are integrated into the optics carrier.

9. The measuring device according to claim 8, wherein the clamping surface is a spring element.

10. The measuring device according to claim 8, wherein the second receptacle has a guide surface integrated into the optics carrier.

11. A measuring device for measuring a distance between a reference mark and a target object, comprising:
   a beam source, wherein a laser beam is generatable by the beam source;
   a detector, wherein a reflected beam of the laser beam is detectable by the detector;
   a beam forming optics, wherein the beam forming optics is disposed in a beam path of the laser beam and the reflected beam;
   a beam splitting optics, wherein the laser beam or the reflected beam are deflectable by the beam splitting optics; and
   an optics carrier including a first receptacle, wherein the beam source is mounted in the first receptacle, and a second receptacle, wherein the beam forming optics are mounted in the second receptacle, and wherein the optics carrier is monolithic;
   wherein the optics carrier includes a third receptacle with three supporting areas, wherein the three supporting areas are integrated into the optics carrier, and wherein the beam splitting optics is mounted in the third receptacle.

12. The measuring device according to claim 11, wherein a first supporting area and a second supporting area of the three supporting areas are wedge-shaped grooves, wherein a third supporting area of the three supporting areas is a planar supporting surface, wherein the third receptacle includes a clamping element, and wherein the beam splitting optics is clamped to the third supporting area by the clamping element.

13. A measuring device, comprising:
   a beam source;
   a beam forming optics;
   a beam splitting optics;
   a monolithic optics carrier, wherein the beam source, the beam forming optics, and the beam splitting optics are mounted in the monolithic optics carrier;
   a detector;
   a circuit board, wherein the detector is connected to the circuit board; and
   a connector, wherein the circuit board is connected to the monolithic optics carrier via the connector, wherein the beam source and the beam forming optics are only adjustable in a direction of a respective optical axis of the beam source and the beam forming optics; and
   wherein the respective optical axes are parallel.

\* \* \* \* \*